United States Patent
Noh

(10) Patent No.: US 6,381,703 B1
(45) Date of Patent: Apr. 30, 2002

(54) GUARANTEEING CLOCK SLEW CORRECTION IN POINT-TO-POINT PROTOCOL PACKET DETECTION WITHOUT DATA LOSS AFTER BAUD RATE DETECTION IN AUTOBAUD MODE

(75) Inventor: Jae Noh, Berkeley, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/368,205

(22) Filed: Aug. 4, 1999

(51) Int. Cl.[7] .................................................. G06F 1/04
(52) U.S. Cl. ....................................................... 713/503
(58) Field of Search ......................................... 713/503

(56) References Cited

U.S. PATENT DOCUMENTS

| | | | |
|---|---|---|---|
| 5,719,862 A | * | 2/1998 | Lee et al. .................... 370/355 |
| 6,049,883 A | * | 4/2000 | Tjandrasuwita ............. 713/322 |
| 6,111,446 A | * | 8/2000 | Keeth ........................ 327/258 |
| 6,266,778 B1 | * | 7/2001 | Bell ............................ 713/400 |

* cited by examiner

Primary Examiner—Thomas M. Heckler
(74) Attorney, Agent, or Firm—Philip R. Wadsworth; Charles D. Brown; George C. Pappas

(57) ABSTRACT

A system and method for affecting the behavior of the transmitting UART that, in turn, results in an internal state change in the receiving UART. The present invention, upon detecting a PPP packet, flow controls the line, causing the transmitting UART to force a marking condition (that is, all ones) or idle state. This idle state enables the receiving UART to exit sampling mode and receive the remaining incoming data within the PPP packet in byte mode. The receiving UART, when operating in byte mode, automatically accounts for slew.

15 Claims, 4 Drawing Sheets

GUARANTEEING CLOCK SLEW CORRECTION IN POINT-TO-POINT PROTOCOL PACKET DETECTION WITHOUT DATA LOSS AFTER BAUD RATE DETECTION IN AUTOBAUD MODE

CROSS-REFERENCE TO RELATED APPLICATIONS

The following applications of common assignee contain some common disclosure as the present application:

U.S. Patent Application entitled "UART Based Autobauding Without Data Loss", application Ser. No. 08/684,346, filed Jul. 18, 1996, in the name of QUALCOMM Incorporated, now U.S. Pat. No. 5,923,705.

U.S. patent application entitled "Accounting For Clock Slew In Serial Communications", application Ser. No. 09/368,204, filed Aug. 4, 1999 in the name of QUALCOMM Incorporated,

BACKGROUND OF THE INVENTION

1. Field of the Invention

The present invention relates generally to the field of mobile communications. More particularly, the present invention relates to a system and method for guaranteeing clock slew correction in serial transmission of point-to-point protocol (PPP) data packets to cellular telephones capable of receiving and transmitting data.

2. Related Art

In addition to voice transmission capabilities, cellular telephones now provide data services. A cellular telephone configured to receive and transmit data allows a user to remotely access the Internet, e-mail, facsimiles, and other data sources using a laptop computer and the cellular telephone. The data provided by the transmitting device must be converted into signals appropriate for processing and transmission by the cellular telephone. Cellular telephones configured in accordance with time division multiple access (TDMA), frequency division multiple access (FDMA) or code division multiple access (CDMA) must convert the data to the appropriate format for their respective protocols.

To correctly process the data, the baud rate at which the data is transmitted to the cellular telephone (via data link such as serial port) must be determined. This process is referred to as autobauding. The cellular telephone must be able to identify the baud rate of the incoming data to effectively convert the data to the appropriate format for transmission.

To lessen power consumption and cut costs, universal asynchronous receive and transmit (UART) devices are used in cellular telephones to process incoming serial data. Usually these devices follow RS-232 protocol and only support the asynchronous portion of the standard. For autobauding, the UART operates in sampling mode until the baud rate for the incoming data is determined. Ideally, once the baud rate and the beginning character of a command are determined, the UART should immediately terminate the sampling mode of operation and process the remaining incoming data in the byte mode of operation. When the UART operates in byte mode, the UART automatically corrects for slew usually by means of phase locked loop hardware. Slew is the difference in clock rates between the transmitting clock and the receiving clock.

Autobaud looks for the following characters: 'A','a', and '~'. 'A' and 'a' represent the beginnings of an AT command. AT commands are comprised of all ASCII characters. RS-232, the EIA standard for serial transmission, requires the beginning of a character to be identified by a start bit. The start bit is always represented as a space (that is, a zero bit). The end of a character is identified by a stop bit. The stop bit is always represented as a mark (that is, a one bit). The most significant bit of an ASCII character is always a space. Thus, for ASCII characters, the stop bit is surrounded by spaces.

'~' is the beginning of a PPP packet. PPP packets contain large strings of characters that are not necessarily ASCII. PPP packets can be of arbitrarily large size (whereas AT commands are limited in size by standard and further by practicality), and PPP packets are not guaranteed to be comprised of ASCII characters. Therefore, the method described in copending application entitled "Accounting for Clock Slew In Serial Communications" will not work reliably for PPP packets (due to lack of the unique feature used in the method described in said application). Also, it is not desirable to stay in sampling mode indefinitely.

What is needed is a system and method that, upon detection of a PPP packet, causes the transmitting UART to stop sending data within a certain number of characters to ensure that clock slew does not cause misinterpretation of the incoming data.

SUMMARY OF THE INVENTION

The present invention satisfies the above mentioned needs by providing a system and method for affecting the behavior of the transmitting UART that, in turn, results in an internal state change in the receiving UART. The present invention, upon detecting a PPP packet, flow controls the line, causing the transmitting UART to force a marking condition (that is, all ones) or idle state. This idle state enables the receiving UART to exit sampling mode and receive the remaining incoming data within the PPP packet in byte mode. The UART, when operating in byte mode, automatically accounts for slew.

Further features and advantages of the invention, as well as the structure and operation of various embodiments of the invention, are described in detail below with reference to the accompanying drawings.

BRIEF DESCRIPTION OF THE FIGURES

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE PREFERRED EMBODIMENTS

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

The present invention is directed toward a system and method that, after the baud rate has been determined and a PPP packet detected, causes the transmitting UART to stop sending data within a certain number of characters to ensure that clock slew does not cause the receiving UART to lose or misinterpret the incoming data. The present invention accomplishes this by flow controlling the line between the transmitting and receiving UARTs. Flow controlling the line causes the line to go idle and, in turn, allows the receiving UART to exit sampling mode and enter byte mode. In byte mode, the receiving UART automatically accounts for slew upon receiving incoming serial data.

Figure 1:
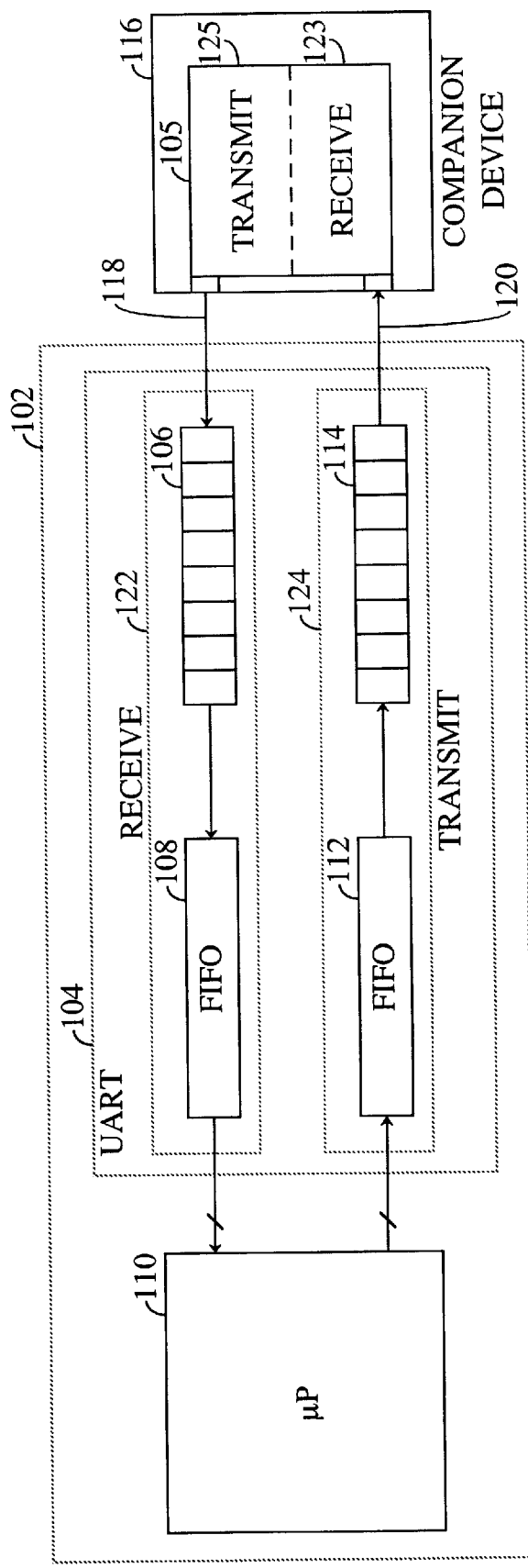
FIG. 1 is a block diagram illustrating an exemplary system in which the present invention is implemented.

FIG. 1 is a block diagram of an exemplary system in which the present invention is implemented. The system comprises a communications device 102, a companion device 116, and two serial connection cables 118 and 120. Serial connection cables 118 and 120 interconnect communications device 102 with companion device 116. In a preferred embodiment, communications device 102 is a cellular telephone and companion device 116 can be any type of data source such as a portable or non-portable computer, facsimile machine, personal digital assistant, etc.

The pertinent parts of communications device 102 are a universal asynchronous receiver/transmitter (UART) 104 and a microprocessor 110. UART 104 converts incoming serial data from companion device 116 via serial connection cable 118 into parallel data for input into microprocessor 110. Parallel data from microprocessor 110 is converted into serial data by UART 104 and transmitted to companion device 116 via serial connection cable 120. Companion device 116 includes its own UART 105 which has a transmit channel 125 and a receive channel 123. As used in this application, UART 105 will be the transmitting UART and UART 104 will be the receiving UART.

UART 104 is comprised of two channels, a receive channel 122 and a transmit channel 124. Receive channel 122 comprises a shift register 106 coupled to a FIFO (first-in first out) storage device 108. Transmit channel 124 comprises a shift register 114 coupled to a FIFO storage device 112. Receive and transmit shift registers 106 and 114, respectively, are 8-bit shift registers. Receive and transmit FIFOs 108 and 112, respectively, are 64×8 bits wide. Both FIFOs 108 and 112 are used to store data. For incoming serial data, shift register 106 performs the serial to parallel conversion as it shifts the data left into FIFO 108. For outgoing parallel data from microprocessor 110, shift register 114 performs the parallel to serial conversion as it shifts data from FIFO 112 to the right. The first byte of data that enters FIFOs 108 and 112 is always the first byte of data retrieved by microprocessor 110 or shift register 114, respectively. The structure of UART 105 is similar.

Figure 4:
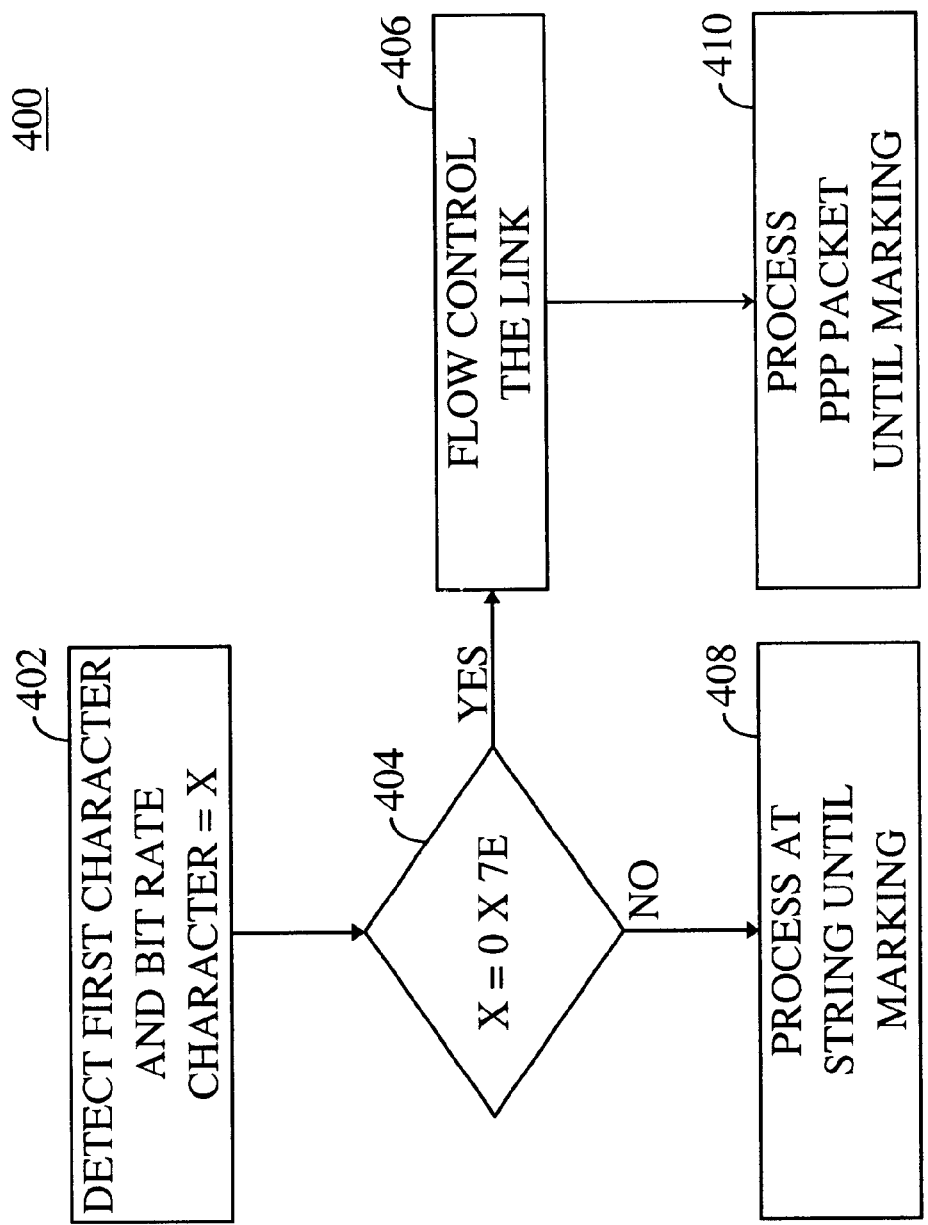
FIG. 4 is a flowchart illustrating a method for preventing data loss after baud rate detection of a PPP packet.

The serial transmission of data signals over serial cables 118 and 120 is performed using the EIA/TIA-RS-232E interface protocol. The EIA/TIA-RS-232E is provided by the Telecommunications Industry Association in a document entitled "ANSI/TIA/EIA-602-1992," dated June, 1992. When UART 104 operates in byte mode, shift register 106 looks for the start and stop bits from the incoming serial data and strips them off. The remaining data is shifted into FIFO 108 for input into microprocessor 110. When UART 104 operates in sampling mode, shift register 106 takes eight samples and shifts them into FIFO 108 without looking for the start and stop bits. The samples remain in FIFO 108 until microprocessor 110 retrieves the samples for processing. As FIFO 108 becomes sufficiently full, an interrupt signal is sent to microprocessor 110. Microprocessor 110 responds accordingly by retrieving all or a portion of the data. Samples retrieved by microprocessor 110 from UART 104 are converted to an appropriate data format for transmission using CDMA protocols. In a preferred embodiment, UART 104 is a QUALCOMM Incorporated MSM UART available from QUALCOMM Incorporated, the assignee of rights to the present invention. Microprocessor 110 also performs the necessary processing to guarantee that slew is accounted for when the incoming serial data is representative of a PPP packet and UART 104 is operating in sampling mode. Processing details are described below with reference to FIG. 4.

Figure 2:
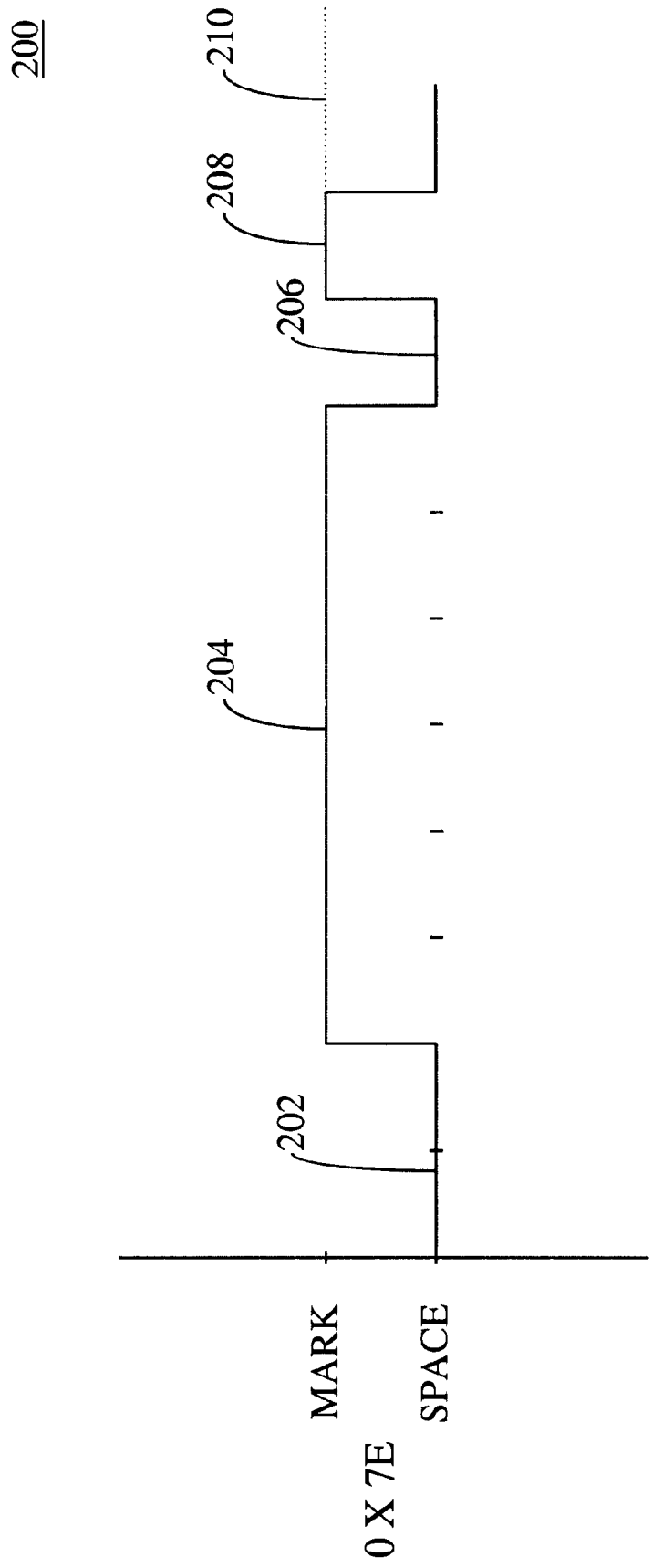
FIG. 2 is a diagram illustrating the starting character of a PPP packet.

All PPP packets begin with the character '~' which is represented as an 0x7e flag in ASCII. The very first PPP packet usually begins and ends with a '~' or 0x7e flag. Thereafter, PPP packets only end with the '~' or 0x7e flag. FIG. 2 represents a diagram illustrating the 0x7e flag. The 0x7e flag includes spaces and marks. Spaces represent zero bits and marks represent one bits. The 0x7e flag comprises a first space 202, a first marking 204, a second space 206, and a second marking 208. First space 202 includes a start bit and a least significant bit (LSB). First marking 204 is comprised of six marks. Second space 206 is the most significant bit (MSB) and second marking 208 is the stop bit.

Figure 3:
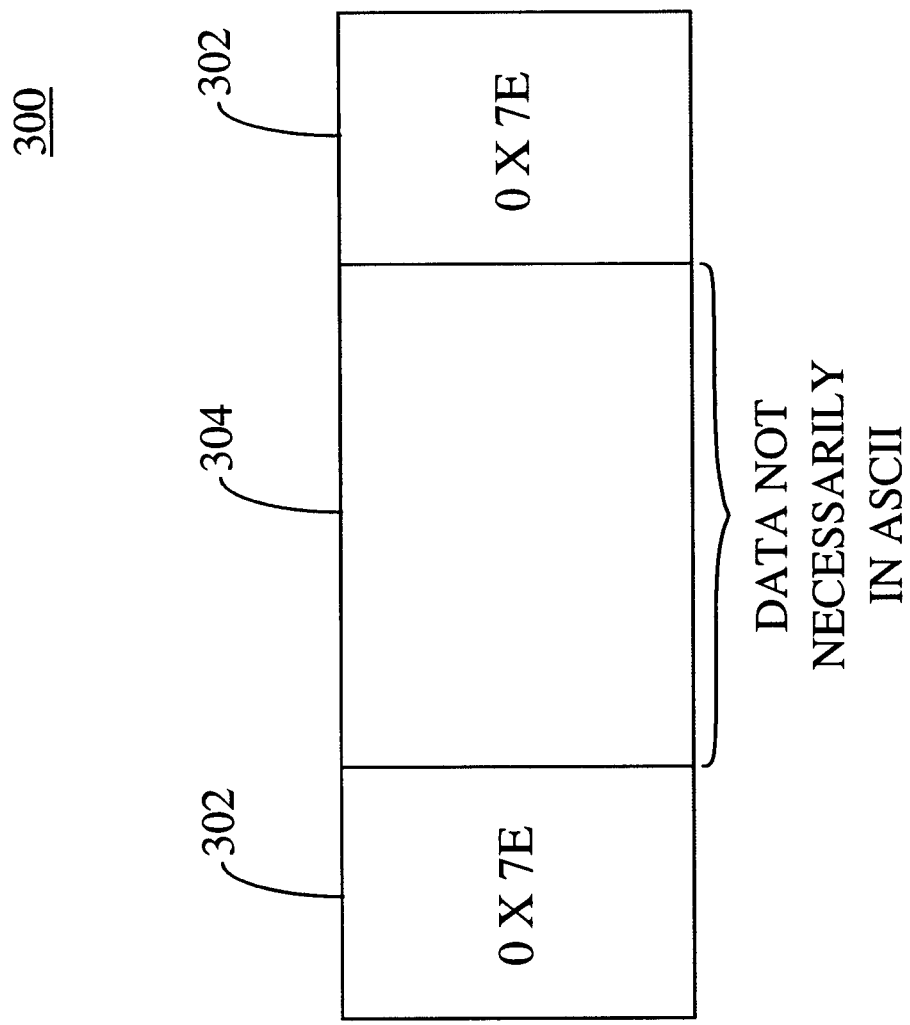
FIG. 3 is a diagram illustrating an exemplary data string of characters within a PPP packet.

An example of a PPP packet 300 is shown in FIG. 3. PPP packets 300 are comprised of ASCII as well as non-ASCII characters. As previously stated, the first PPP packet begins and ends with 0x7e flag 302. The 0x7e flag 302 is an ASCII character. The data 304 within PPP packet 300 may contain ASCII as well as non-ASCII characters. The mix of ASCII characters to non-ASCII characters in a PPP packet is usually 50:50. This poses a problem when UART 104 is in sampling mode. Clock slew cannot be accounted for when the incoming data is not ASCII, by use of the method described in copending application entitled "Accounting for Clock Slew In Serial Communications". When non-ASCII characters are transmitted with ASCII characters, there is no guaranteed feature, such as the stop bit being surrounded by spaces, on which to base an algorithm to account for clock slew when UART 104 operates in the sampling mode. Although UART 104 can account for clock slew when operating in byte mode, UART 104 requires a long string of marks to exit out of sampling mode into byte mode. With a mixture of ASCII and non-ASCII characters, a long string of marks may not appear until it is too late to account for clock slew.

Clock slew arises when the clock of the transmitting device (e.g. UART 105 of companion device 116) operates at a slower or faster rate than the clock of the receiving device 102. For autobauding, UART 104 operates in sampling mode to determine the baud rate and identify the type of command (that is, AT commands or PPP packet). The procedure for determining the baud rate and identifying the command type is disclosed in copending application entitled "UART Based Autobauding Without Data Loss", Application Ser. No. 08/684,346, filed on Jul. 18, 1996(Attorney Docket No. QCPA276), incorporated herein by reference in its entirety. If clock slew is not accounted for, the transmitted serial data will be lost or misinterpreted by the receiving UART.

The method of the present invention overcomes these problems by affecting the behavior of the transmitting UART 105 to bring about a change in the internal state of the receiving device 102 (a mobile phone in preferred embodiment). The method is described with reference to FIG. 4. Using microprocessor 110, step 402 determines the baud rate and identifies the command type. As previously stated, this procedure is disclosed in the above-referenced copending application "UART Based Autobauding Without Data Loss".

In decision step 404, if the first character represents PPP flag 302, control passes to step 406. In step 406, the data link 118 is flow controlled to prevent data loss. Flow control can be done through hardware or software means using techniques well known to those or ordinary skill in the art. Flow controlling the link 118 forces the transmitting UART 105 to stop sending data and output a string of marks indicating an idle state. A forced marking condition 210 is shown in phantom in FIG. 2. The string of marks enables receiving UART 104 to exit out of sampling mode into byte mode where hardware automatically accounts for clock slew. Control then passes to step 410.

In step 410, PPP packet 300 is processed by UART 104 in sampling mode until a marking condition occurs, at which time sampling mode can be exited and byte mode entered Returning to decision step 404, if the first character does not represent PPP flag 302, it represents an AT command and control passes to step 408. In step 408 the AT string is processed by UART 104 in byte mode until a marking condition occurs.

Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for guaranteeing clock slew correction in serial communications between a transmitting device and a receiving device after determining baud rate for an incoming stream of data characters, comprising the steps of:

(a) detecting a starting character in said stream of data characters;

(b) determining whether said starting character indicates that said incoming stream of data characters contains non-ASCII characters;

(c) flow controlling said transmitting device, if said starting character indicates that said incoming stream of data characters contains non-ASCII characters; and (d) processing said incoming stream of data characters comprising non-ASCII characters in sampling mode of operation until a marking occurs, if said starting character indicates that said incoming stream of data characters contains non-ASCII characters.

2. The method of claim 1, further comprising the step of processing said incoming stream of data characters comprising ASCII characters until a marking occurs, if said starting character does not indicate that said incoming stream of data characters contains non-ASCII characters.

3. The method of claim 1, wherein said starting character indicating that said incoming stream of data characters contains non-ASCII characters is an 0×7e flag.

4. The method of claim 2, wherein said starting character indicating that said incoming stream of data characters does not contain non-ASCII characters is one of an 'A' and an 'a'.

5. The method of claim 1, wherein step (c) comprises the step of forcing a marking condition on said transmitting device to cause said receiving device to exit sampling mode and enter byte mode of operation to automatically correct for clock slew.

6. The method of claim 3, wherein said incoming stream of data characters is a point-to-point protocol (PPP) packet.

7. A system for guaranteeing clock slew correction in serial communications between a transmitting device and a receiving device after determining baud rate for an incoming stream of data characters, comprising:

means for determining whether said incoming stream of data characters contains non-ASCII characters;

means for causing said transmitting device to stop sending said incoming stream of data characters if said incoming stream of data characters contains non-ASCII characters; and means for causing said receiving device to exit a sampling mode of operation and enter into a byte mode of operation to enable said receiving device to account for slew when receiving said incoming stream of data characters containing non-ASCII characters.

8. The system of claim 7, wherein said incoming stream of data characters containing non-ASCII characters is a PPP packet.

9. The system of claim 7, wherein said means for causing said transmitting device to stop sending said incoming stream of data characters containing non-ASCII characters comprises means in said receiving device for flow controlling said transmitting device.

10. The system of claim 7, wherein said means for causing said receiving device to exit said sampling mode of operation and enter into said byte mode of operation is a marking condition representing an idle state.

11. The system of claim 7, further comprising processing means for processing said incoming stream of data characters containing non-ASCII characters in said byte mode of operation until a marking condition occurs.

12. The system of claim 7, further comprising processing means for processing said incoming stream of data characters containing all ASCII characters in sampling mode of operation until a marking condition occurs.

13. The system of claim 12, wherein said incoming stream of data characters containing all ASCII characters begins with one of an 'A' and 'a'.

14. The system of claim 7, wherein said receiving device comprises a universal asynchronous receive/transmit device.

15. The system of claim 7 wherein action is taken to affect said transmitting device in order to alter the mode of operation of said receive device.

* * * * *